(12) United States Patent
Modi et al.

(10) Patent No.: US 10,572,391 B2
(45) Date of Patent: Feb. 25, 2020

(54) METHODS AND APPARATUS FOR IMPLEMENTING A LOGICAL TO PHYSICAL ADDRESS MAPPING IN A SOLID STATE DRIVE

(71) Applicant: Western Digital Technologies, Inc., San Jose, CA (US)

(72) Inventors: Anshul Modi, Bangalore (IN); Chaitanya Kavirayani, Bangalore (IN); Rishabh Dubey, Bangalore (IN); Sampath Raja Murthy, Bangalore (IN); Satish Kumar, Chennai (IN); Vijay Sivasankaran, Bangalore (IN)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 58 days.

(21) Appl. No.: 15/893,392

(22) Filed: Feb. 9, 2018

(65) Prior Publication Data
US 2019/0251039 A1    Aug. 15, 2019

(51) Int. Cl.
*G06F 12/1009* (2016.01)
*G06F 3/06* (2006.01)

(52) U.S. Cl.
CPC ........ *G06F 12/1009* (2013.01); *G06F 3/0604* (2013.01); *G06F 3/068* (2013.01); *G06F 3/0659* (2013.01); *G06F 2212/1044* (2013.01); *G06F 2212/202* (2013.01); *G06F 2212/657* (2013.01)

(58) Field of Classification Search
None
See application file for complete search history.

(56) References Cited

U.S. PATENT DOCUMENTS

| 8,909,851 B2 | 12/2014 | Jones et al. |
| 9,348,758 B2 | 5/2016 | Pignatelli |
| 9,448,946 B2 | 9/2016 | Higgins et al. |
| 9,652,376 B2 | 5/2017 | Kuzmin et al. |

(Continued)

OTHER PUBLICATIONS

Jeong et al, "Improving Flash Storage Performance by Caching Address Mapping Table in Host Memory"; Jul. 2017; https://www.usenix.org/sites/default/files/conference/protected-files/hotstorage17_slides_jeong.pdf; 20 pages.

*Primary Examiner* — Charles Rones
*Assistant Examiner* — Jonah C Krieger
(74) *Attorney, Agent, or Firm* — Loza & Loza, LLP; Gabriel Fitch

(57) ABSTRACT

Aspects of the disclosure provide for managing a logical to physical (L2P) table in a Solid State Drive (SSD). Methods and apparatus provide for using a non-volatile memory (NVM) to store the L2P table in its entirety, where the L2P table is separated into a plurality of partitions. The SSD is partitioned into front and back-end processing portions where a partition table is managed by the back-end portion and includes one or more addresses of partitioned portions of the plurality partitions of the L2P table stored in the NVM. The back-end processing portion receives requests from the host via the front-end processing portion and accesses the partition table for scheduling read or write access to the NVM by determining one or more addresses of the respective partitioned portions of the plurality partitions of the L2P table stored in the NVM from the partition table.

32 Claims, 11 Drawing Sheets

(56) References Cited

U.S. PATENT DOCUMENTS

| | | |
|---|---|---|
| 9,720,605 B2 | 8/2017 | Lin et al. |
| 2005/0060426 A1* | 3/2005 | Samuels ................ H04L 41/12 709/238 |
| 2009/0113121 A1 | 4/2009 | Lee et al. |
| 2010/0005272 A1* | 1/2010 | Vuletic ................ G06F 9/3877 711/213 |
| 2011/0138100 A1 | 6/2011 | Sinclair |
| 2012/0203958 A1* | 8/2012 | Jones ................ G06F 12/0246 711/103 |
| 2013/0042156 A1* | 2/2013 | Srinivasan .......... G06F 11/1443 714/54 |
| 2016/0139847 A1* | 5/2016 | Ueki ..................... G06F 3/0638 711/103 |
| 2018/0024778 A1* | 1/2018 | Singh ................... G06F 3/0604 711/103 |
| 2018/0024920 A1* | 1/2018 | Thomas .............. G06F 12/0246 711/103 |
| 2019/0073133 A1* | 3/2019 | Jiang ..................... G06F 3/0608 |
| 2019/0108131 A1* | 4/2019 | Lee ..................... G06F 12/1009 |

\* cited by examiner

US 10,572,391 B2

METHODS AND APPARATUS FOR IMPLEMENTING A LOGICAL TO PHYSICAL ADDRESS MAPPING IN A SOLID STATE DRIVE

FIELD

The present disclosure relates generally to solid state drives (SSDs), and more specifically, to methods and apparatus for implementation and management of logical to physical address mapping in SSD devices.

INTRODUCTION

In a variety of consumer electronics, solid state drives (SSDs) incorporating non-volatile memories (NVMs) are frequently replacing or supplementing conventional rotating hard disk drives for mass storage. These non-volatile memories may include one or more flash memory devices, such as NAND flash memories. The NVMs may also include multiple NAND flash dies or chips that comprise the NVM.

A flash translation layer (FTL) within an SSD controller maintains logical to physical mapping using, in part, a Logical-to-Physical (L2P) table. Each entry of an L2P table maintains mapping information for one host logical page. Typically, a logical page has a size of 4096 bytes (4 KB) of information and the entry size for mapping the page in the L2P table is typically 4 bytes. For a large capacity SSD, such as a 16 terabyte (16 TB) SSD, the L2P table size may become 20 gigabytes (20 GB) in size. Typically, however, SSDs do not have random access memories (RAMs) larger than 4 GB in the SSD controller for both power and cost reasons. Thus, it becomes problematic to allocate such a large L2P table in RAM memory in an SSD controller at run time.

SUMMARY

According to an aspect, a Solid State Drive (SSD) is disclosed that includes an apparatus for managing a logical to physical (L2P) table in the SSD. The SSD includes a front-end processing portion configured to interface with a host device and manage input and output requests from the host device and transfer data to or from the host device; a non-volatile memory (NVM) configured to store the L2P table in its entirety, where the L2P table is further separated into a plurality of partitions. Furthermore, the SSD includes a back-end processing portion communicatively coupled with the front-end processing portion and the NVM, and a random access memory (RAM) communicatively coupled with the back-end processing portion. The RAM includes a partition table that is stored in the RAM wherein the partition table includes one or more addresses of respective partitioned portions of the plurality partitions of the L2P table stored in the NVM. Also, the back-end processing portion is configured to receive requests from the host via the front-end processing portion and to access the partition table for scheduling read or write access to the NVM based by determining one or more addresses of the respective partitioned portions of the plurality partitions of the L2P table stored in the NVM from the partition table.

According to another aspect, a method for operating a solid state drive (SSD) including a non-volatile memory (NVM) is disclosed. The method includes receiving a host request at a front-end portion, and then initiating signaling to a back-end portion for reading a logical to physical address table (L2P table) stored entirely in a non-volatile memory (NVM) communicatively coupled to the back-end portion, wherein the L2P table includes a plurality of L2P table partitions. Additionally, the method includes determining an L2P table partition to be read from the NVM based on reading a partition table stored in a random access memory (RAM) coupled to the back-end portion, where the partition table includes a plurality of partition addresses corresponding to the plurality of L2P table partitions stored in NVM to determine a partition address of a desired L2P table partition. Moreover, the method includes reading the desired L2P table partition from the NVM into the RAM based on the partition address of the desired L2P table partition, and performing the host request using at least the back-end portion based on a physical NVM address determined from the desired L2P table partition.

In another aspect, an apparatus for operating a solid state drive (SSD) including a non-volatile memory (NVM) is disclosed. The apparatus includes first means for interfacing with a host device and managing input and output requests from the host device and transfer data to or from the host device. Additionally, the apparatus includes a non-volatile memory (NVM) configured to store a logical to physical address table (L2P table) in its entirety, where the L2P table is further separated into a plurality of partitions. Furthermore, the apparatus includes second means for back-end processing that is communicatively coupled with the first means and the NVM, the second means configured to receive requests from the host via the first means and to access a partition table that is stored in a random access memory (RAM) communicatively coupled with the second means, wherein the partition table includes one or more addresses of respective partitioned portions of the plurality partitions of the L2P table stored in the NVM.

DETAILED DESCRIPTION

Figure 1:
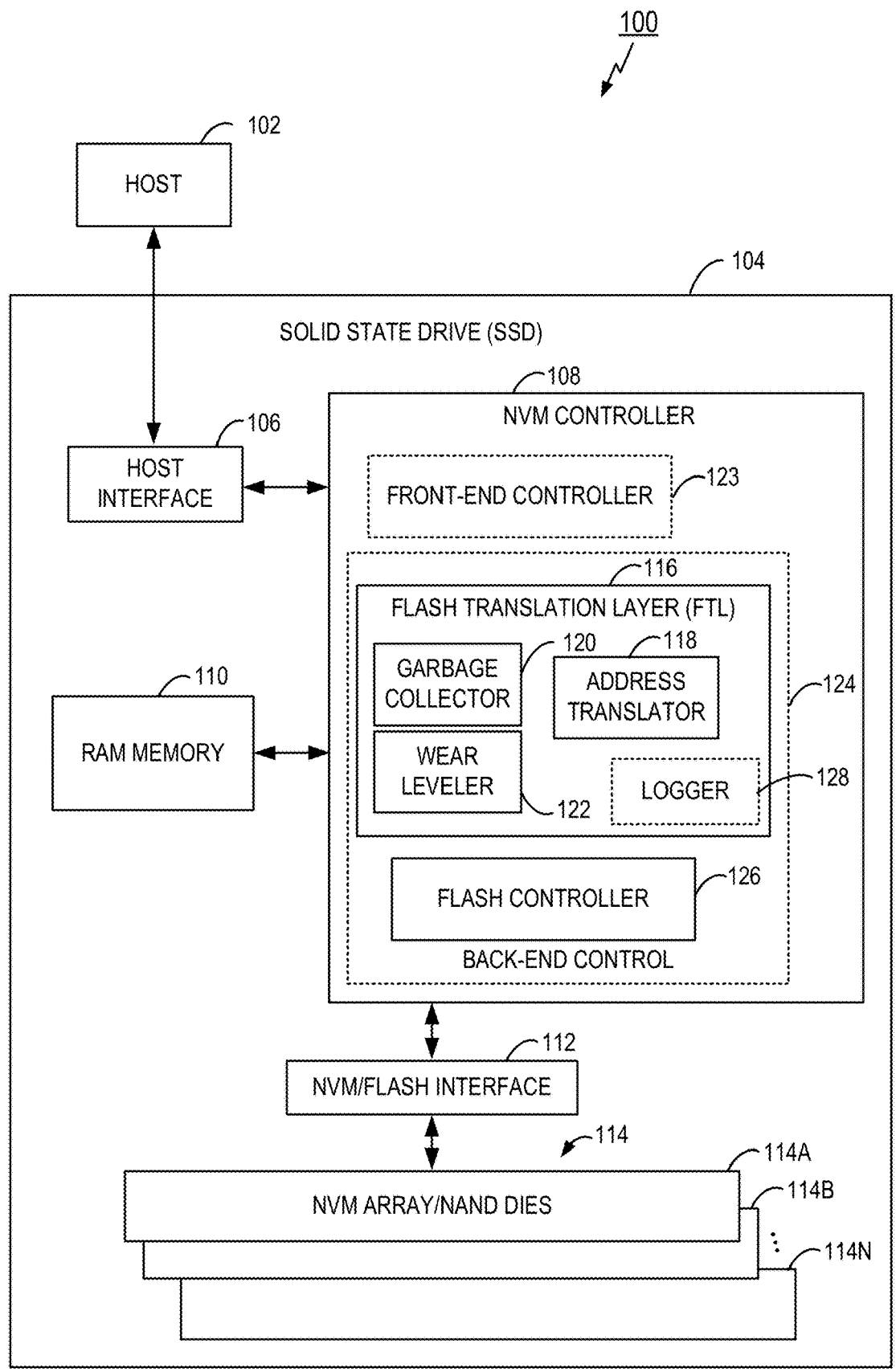
FIG. 1 shows an exemplary schematic block diagram configuration for an SSD device.

To address the problems described above, the disclosed methods and apparatus bifurcate an SSD into two operational parts (1) an SSD front-end and (2) an SSD back-end. The SSD front-end works like an interface layer for the host, accepting the input/output (I/O) requests from the host and passing them to the back-end. The front-end also takes care of data transfer between host and the SSD. The SSD back-end processes the I/O requests given by the front-end and manages the flash array and performs the read/write/erase operations, as examples. The FTL is also configured to run on the SSD back-end. In this manner, the presently disclosed methods and apparatus make it possible to accommodate large L2P tables without the need for an increase in the size of the RAM memory in the SSD controller.

It is noted that in other solutions to the problem of increased L2P table sizes in large SSDs, the host logical page size may be increased from the typical 4 KB size to a larger size. For example, if host logical page size is set at 8 KB then the size of L2P table may be reduced by half compared to the case when logical page size is 4 KB. With logical page sizes of 8 KB, however, any random write of size less than 8 KB requires a read-modify-write. This presents both performance and endurance problems. In this approach, as the capacity of the SSD increases (e.g., a 16 TB SSD with a 16 KB logical page size), the problems of read-modify-write and the attendant performance and endurance costs that result with every read-modify-write for any writes less than the logical page size (e.g., less than 16 KB) may become even more frequent. Accordingly, increasing the host logical page size is not the most practical or scalable solution as the capacities of SSDs increase.

In yet other solutions, the L2P table may be only partially loaded in RAM at run time. For example, for a 16 TB SSD with a 16 GB L2P table, the SSD controller may only store a part of the L2P table in RAM, such as 2 GB of the L2P in one example. Thus, the remaining 14 GB of L2P table would remain stored the in the NVM in this example. The L2P entries stored in RAM may be based on caching algorithms based on the host I/O patterns. During host read or write, if the request is for the logical page whose mapping is available in RAM (i.e. L2P table cache hit), then the FTL can just complete the command to the corresponding physical page. However, if the L2P table entry is not currently available in RAM the FTL needs to first issue a read of the L2P table entry from NVM and then it can complete the operation. This potential of the L2P table entry being unavailable adds to latency in host read or write. While this solution is scalable to support high capacity SSDs, it may present performance issues. Thus, for certain applications such as enterprise SSDs that require strict I/O consistency, the L2P hit or miss nature of this solution may result in a bimodal distribution that would be unacceptable in such applications.

Referring now to the drawings, FIG. 1 is a block diagram of a system 100 including an exemplary solid state device (SSD) in which the disclosed methods and/or algorithms herein may be implemented in accordance with aspects of the disclosure. The system 100 includes a host 102 and a SSD storage device 104 coupled to the host 102. The host 102 provides commands to the SSD storage device 104 for transferring data between the host 102 and the SSD storage device 104. For example, the host 102 may provide a write command to the SSD storage device 104 for writing data to the SSD storage device 104 or a read command to the SSD storage device 104 for reading data from the SSD storage device 104. The host 102 may be any system or device having a need for data storage or retrieval and a compatible interface for communicating with the SSD storage device 104. For example, the host 102 may a computing device, a personal computer, a portable computer, a workstation, a server, a personal digital assistant, a digital camera, or a digital phone as merely a few examples.

The SSD storage device 104 includes a host interface 106, a controller 108 (or alternatively, an NVM controller 108), which also includes a RAM memory 110, a non-volatile memory (NVM) interface 112 (which may also be referred to as a Flash memory interface), and a non-volatile memory (NVM) 114, such as a NAND Flash memory composed of one or a multiple number of NAND dies, for example. The host interface 106 is coupled to the controller 108 and facilitates communication between the host 102 and the controller 108. Additionally, the controller 108 is coupled to the RAM memory 110 as well as the NVM 114 via the NVM interface 112. The host interface 106 may be any type of communication interface, such as an Integrated Drive Electronics (IDE) interface, a Universal Serial Bus (USB) interface, a Serial Peripheral (SP) interface, an Advanced Technology Attachment (ATA) or Serial Advanced Technology Attachment (SATA) interface, a Small Computer System Interface (SCSI), an IEEE 1394 (Firewire) interface, or the like. In some embodiments, the host 102 includes the SSD storage device 104. In other embodiments, the SSD storage device 104 is remote with respect to the host 102 or is contained in a remote computing system communicatively coupled with the host 102. For example, the host 102 may communicate with the SSD storage device 104 through a wireless communication link.

The controller 108 controls operation of the SSD storage device 104. In various aspects, the controller 108 receives commands from the host 102 through the host interface 106 and performs the commands to transfer data between the host 102 and the NVM 114. Furthermore, the controller 108 may manage reading from and writing to memory 110 for performing the various functions effected by the controller and to maintain and manage cached information stored in memory 110.

The controller 108 may include any type of processing device, such as a microprocessor, a microcontroller, an embedded controller, a logic circuit, software, firmware, or the like, for controlling operation of the SSD storage device 104. In some aspects, some or all of the functions described herein as being performed by the controller 108 may instead be performed by another element of the SSD storage device 104. For example, the SSD storage device 104 may include a microprocessor, a microcontroller, an embedded controller, a logic circuit, software, firmware, or any kind of processing device, for performing one or more of the functions described herein as being performed by the controller 108. According to other aspects, one or more of the functions described herein as being performed by the controller 108 are instead performed by the host 102. In still further aspects, some or all of the functions described herein as being performed by the controller 108 may instead be performed by another element such as a controller in a hybrid drive including both non-volatile memory elements and magnetic storage elements.

The RAM memory 110 may be any memory, computing device, or system capable of storing data. For example, the memory 110 may be a random-access memory (RAM), a dynamic random-access memory (DRAM), a double data rate (DDR) DRAM, a static random-access memory (SRAM), a synchronous dynamic random-access memory (SDRAM), a flash storage, an erasable programmable read-only-memory (EPROM), an electrically erasable programmable read-only-memory (EEPROM), or the like. In various embodiments, the controller 108 uses the memory 110, or a portion thereof, to store data during the transfer of data between the host 102 and the NVM 114. For example, the memory 110 or a portion of the memory 110 may be a cache memory.

The NVM 114 receives data from the controller 108 via the NVM interface 112 and stores the data. The NVM 114 may be any type of non-volatile memory, such as a flash storage system, a NAND-type flash memory, a solid state drive, a flash memory card, a secure digital (SD) card, a universal serial bus (USB) memory device, a CompactFlash card, a SmartMedia device, a flash storage array, or the like. The NVM 114 may further be constructed with a number of memory die, as illustrated by NAND memory dies 114A, 114B, and so forth to some N number of dies (i.e., 114N) in the NVM 114. It is also noted that the controller 108 may also include hardware, firmware, software, or any combinations thereof that implement read retry, as will be discussed herein.

In the example of FIG. 1, read requests will generally comprise a request from the host 102 via the interface 106 to read the data within a given logical Page address associated with the NVM 114. Each logical Page address is associated with a specific physical address within the NVM 114 through the use of the Logical to Physical (L2P) table maintained by the system controller 108, and more particularly by a Flash Translation Layer (FTL) 116. In general, the L2P table maps each logical Page address to a physical Page address within the NVM 114. The use of logical Page addresses and a logical-to-physical Page address conversion allows the controller 108 to effectively manage the memory within the NVM 114 and to implement various mapping and mechanisms, including the disclosed L2P table using having front end and back end portions.

In a further aspect, the FTL 116 may include an address translator 118 for performing the translation between logical and physical addresses, as well as to, in part, implement the L2P table. Furthermore, the FTL 116 may include a garbage collector process, module, or algorithm 120 that copies valid data into new or free areas and erases invalid data in physical block locations of the NVM 114 in order to free this invalid memory space. Still further, the FTL 116 may include a wear leveler process, module, or algorithm 122 used to ensure that erasures and re-writes are distributed evenly across the NVM 114.

As mentioned above, the presently disclosed methods and apparatus include a solution whereby an SSD is divided into two parts[N]: the SSD front-end and the SSD back-end. In the proposed solution, the entire L2P table is stored in Flash and it is read only when it is needed. The L2P table is divided into several partitions comprising a predetermined number (e.g., 64) of contiguous L2Ps that makes up one L2P partition and it is written together on flash. The flash address of each of the partitions are always loaded in DDR while the actual L2P table is read from partition table's flash address when needed. In one example, the NVM controller 108 may include a front-end controller or control portion 123 that acts as the interface with the host for read/write requests. In another aspect, the FTL 116 may be configured such that it is considered part of a back-end control or processing portion 124 that achieves access of the NVM 114 through an L2P table that is stored in the NVM 114. As part of the back-end processing portion 124, a controller or apparatus for controlling the flash or NVM memory 114 may also be included as shown by flash controller 126.

In a further aspect, the FTL 116 may include a logger or logging function 128 that effects logging of memory locations for the L2P table in the NVM 114. Specifically, the logger 128 is used to log or record the changes made to the L2P table during reads, writes, or garbage collection, which are then ultimately written to the NVM 114 to update the L2P table.

Figure 2:
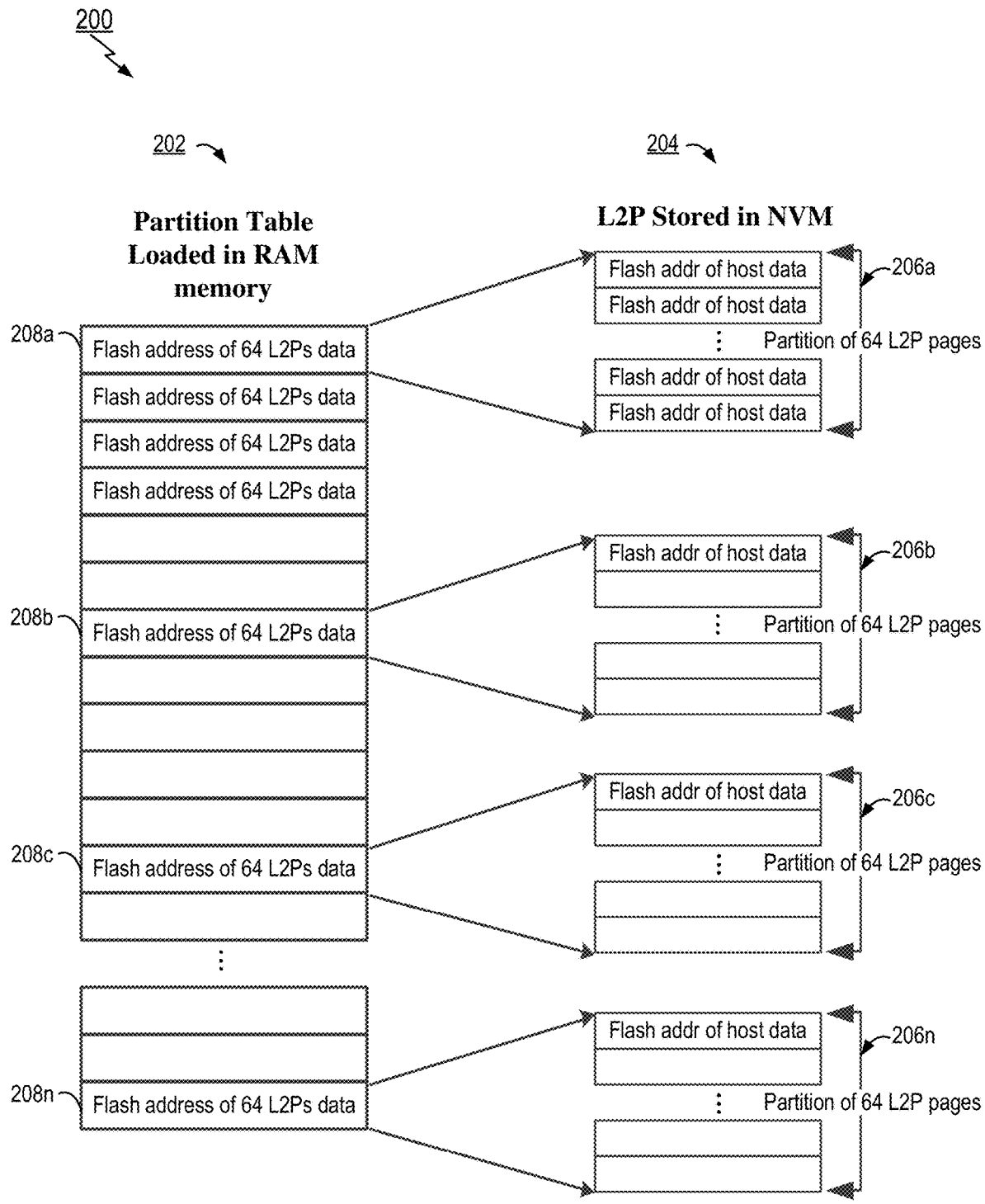
FIG. 2 illustrates an example of a logical-to-physical (L2P) partition table mapping according to an aspect of the present disclosure.

FIG. 2 illustrates an exemplary structure 200 of an L2P table management scheme in accordance with aspects of the present disclosure. In this example, the L2P table is managed by operationally splitting (i.e., not physically splitting) the SSD between an SSD front-end and an SSD back-end. In particular, a partition table 202 is provided in the RAM memory accessible with the FTL. The partition table 202 contains addresses of groupings or partitions of the L2P table 204 that is stored in the back-end (i.e., the Flash or NVM memory (e.g., NVM 114)) in its entirety. The partition table 202 may be stored in RAM (e.g. RAM 110) in what may be considered the front-end portion of the SSD. The L2P table 204 is stored in the Flash or NVM memory 114 and is read only when it is needed. As further illustrated, the L2P table 204 is divided in several L2P partitions 206, with each L2P partition 206 consisting of a predetermined number of contiguous L2P addresses in the Flash or NVM 114 that are written together on the NVM 114. In the example of FIG. 2, the predetermined number is 64 contiguous L2P addresses, but this is only exemplary and the number could be greater or less than this amount. The storage of the entire L2P table 204 in the Flash or NVM thus avoids having to store the L2P table in RAM memory to allow minimization of the RAM capacity, which is particularly advantageous for larger SSD devices where the L2P tables become much larger.

As further illustrated, the partition table 202 contains multiple entries 208, each of which contains a flash or NVM address of a respective partition 206 in the L2P table 204 stored in the NVM. As examples, entry 208a contains the flash address of the partition 206a containing the flash address of a partition having 64 L2P pages, entry 208b contains the flash address of the partition 206b containing the flash address of a partition having 64 L2P pages, and so forth. The flash address 208 of each partition 206 is always loaded in the RAM memory (e.g., 110), while the actual L2P table is then read into RAM from partition table's flash address in the NVM 114 when needed.

The L2P configuration of FIG. 2 operates such that when the front-end portion of the NVM controller 108 receives a read request from the host 102, the request is queued to the FTL (e.g., 116). To process the host read, the FTL 116 loads the partition portion (e.g., 206) of the L2P table 204 containing those addresses that will map to the requested data into the RAM 110, for example. To read the L2P for incoming host requests, the controller 108 is configured to first look into the partition table 202 to get the flash address where the pertinent partition of the L2P is written. The FTL 116 sends the L2P address and the host data read request to a control within the NVM controller 108 or, alternatively, a dedicated back-end control or processing portion (e.g., 124 in FIG. 1) to process these requests one after the other. The back-end control process includes issuing a read request to the L2P flash address. Once the L2P address is read from the L2P partition, this allows the NVM controller 108 to obtain the flash or NVM physical address from the L2P data for the data requested from the host and issues the host data read to the NVM 114 via the interface 112, for example.

It is further noted that the operational back-end can process multiple I/O requests in parallel, whereas the host I/O data transfer via host interface 106 occurs in serial. Because of the serialized host data transfer, the back-end control portion will have a lot of idle time while the front-end processes are busy serially transferring data from the SSD device to the host. Accordingly in another aspect, the present methods and apparatus may utilize the back-end idle time to effectively hide the L2P read behind the host data transfer time, which may be ideal for lower performance, cost sensitive interfaces such as SATA or PCI, as examples. In a particular aspect of the present disclosure, it is noted that the L2P reads can be hidden behind host data transfer during random read operations. In the cases of slower interfaces such as a Serial AT attachment (SATA) interfaces, for example, an interface takes approximately 7 to 8 μsec to transfer 4K of data. Thus, in order to transfer 32 commands of data the interface would take approximately 224 to 256 μsec. As the back-end can perform multiple read operations in parallel, it would eventually take one read completion time to perform 32 reads in parallel. Thus, 32 4K I/Os of data would be available to the front-end within 60~70 μsec. Additionally, the host device can send a new read request at the completion of each host data transfer. In this way all the L2P reads will be hidden behind the host read data transfer, and therefore the presently disclosed scheme will have no impact on random read performance in such instances.

Figure 3:
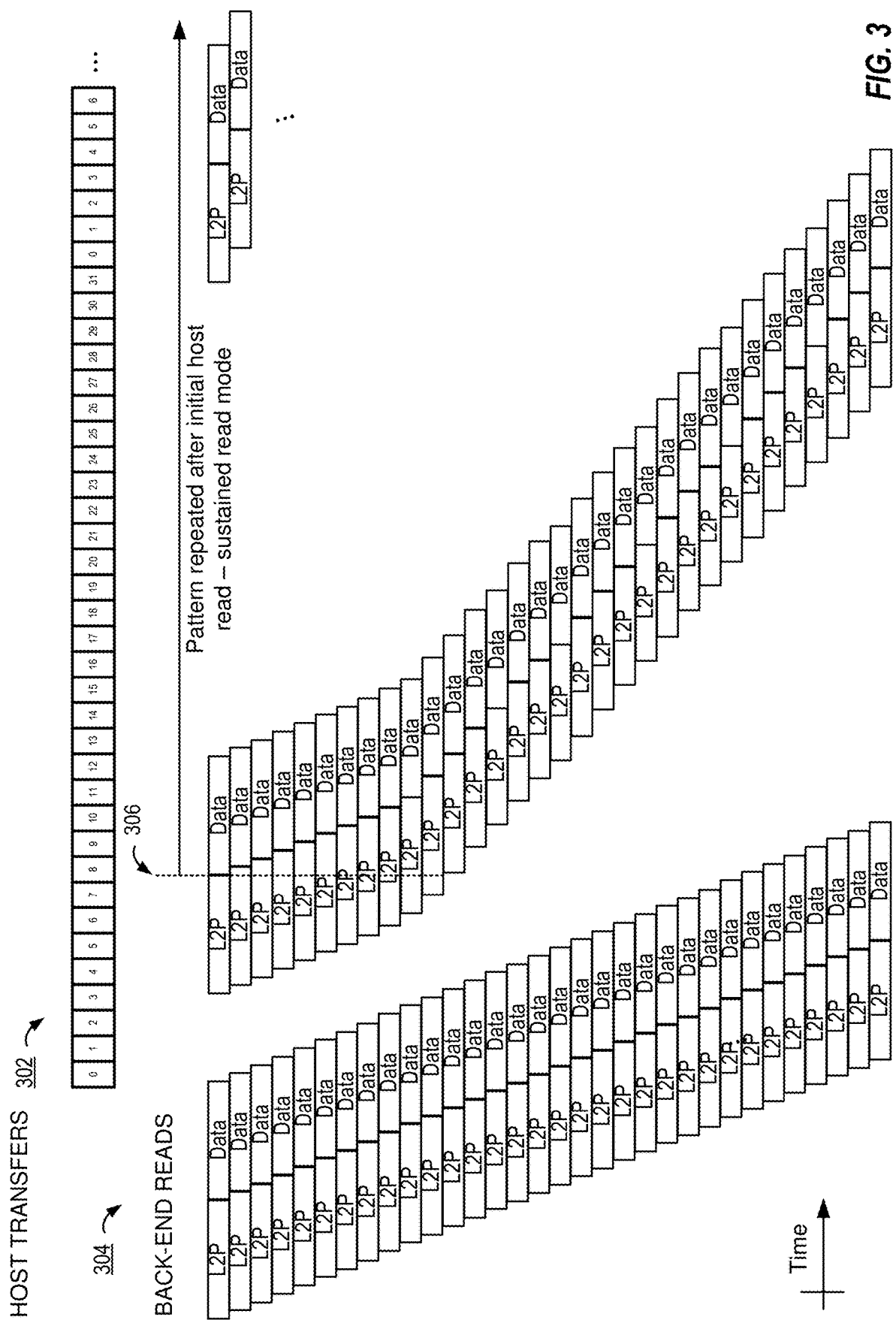
FIG. 3 illustrates the timing of host transfers and back-end L2P reads according to an example of the operation of the presently disclosed scheme.
Figure 4:
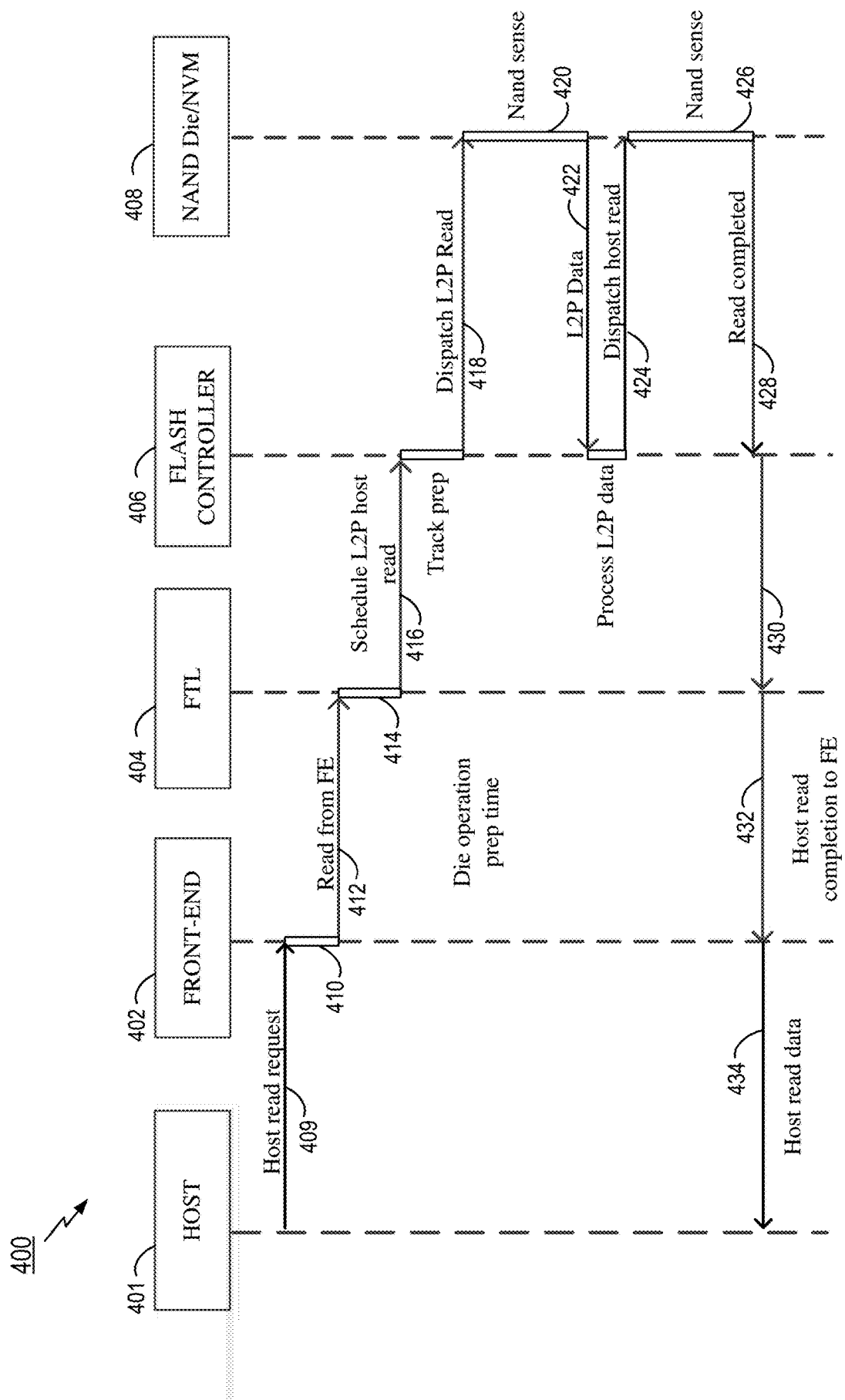
FIG. 4 illustrates a flow sequence diagram of an exemplary method for reads according to aspects of the present disclosure.

FIG. 3 illustrates the timing of host transfers and back-end L2P reads according to an example of the operation of the present scheme, where the passage of time is shown from left to right in the figure. In this example, the host transfers 302 for 32 transfers of 4K of data are shown serially occurring before repeating for another 32 transfers and so forth. Given the example above, the time for the 32 transfers to the host in total would be approximately 224 to 256 μsec. The back-end reads are shown at 304, with each read including an L2P address determination time and a data read time. Since these reads are performable in parallel, the back-end reads may be performed much quicker. In the example above, 32 I/Os of 4K of data will be available within approximately 60 to 70 μsec. Thus, FIG. 3 illustrates that L2P reads 304 may be hidden behind the host data transfer 302. After the initial transfers or an initial read mode, the process may enter a sustained read mode where the rate of reads is a normal rate. This transition is indicated at an approximate time 306, which is merely illustrated as one example of the timing, where the read mode enters the sustained read mode. FIG. 4 illustrates a flow sequence diagram 400 showing an exemplary sequence for handling host read requests in accordance with the disclosed scheme. As illustrated, the sequence 400 shows messaging between a host device 401, a front-end 402, such as the front-end controller 123, the FTL 404, a flash controller 406 (which may be part of back-end control 124 as illustrated in FIG. 1 at 126), and the NAND dies 408 (e.g., dies 114). The diagram 400 shows that when the front-end 402 receives a read request 409 from the host device 401, after some amount of processing time 410 in the front-end 402, the read request is sent to the FTL 404 as illustrated at 412. In turn, the FTL 404, which may be part of the back-end processing, will determine the L2P address based on the partition table stored in RAM. Thus, after this processing time (shown at 414), the FTL 404 sends a scheduling message 416 to the flash controller 406 to schedule the reading of the L2P partition in the L2P table stored in the NAND die. A dispatch message 418 is sent from the flash controller 406 to the NAND dies 408 to access the L2P partition data portion. After a NAND sense time 402 420, the L2P partition data is sent to the flash controller 406 as shown by transfer 422.

The L2P partition data is then loaded to RAM by the flash controller 406. The flash controller 406 may then use this data to determine the physical address of the requested data in the NAND dies 408. Accordingly, the flash controller 406 may then dispatch the host read request illustrated at 424 to the NAND dies 408. After a NAND sense time 426, the requested data is read and send to the flash controller 406 as illustrated by read completion message 428. The flash controller 406 and the FTL 404 then pass the read data to the front-end control 402 (and host device 401) without any appreciable delay as shown by arrows 430, 432, and 434.

It is further noted that in the sequence of FIG. 4, when the front-end portion 402 receives a read request from the host, it will queue the read request to FTL 404. Given the present scheme, in order to process the host read, the FTL 404 needs to load the L2P table first. Thus, in order to read the L2P table for coming host requests, the FTL will first look in the partition table stored in RAM to obtain the flash or NAND address where the L2P partition containing the L2P address is written. The FTL 404 serves to send a scheduled L2P read request (416) to the flash controller 406, where the read includes instruction for the back end controller 406 to request both the L2P read first and then the actual host data read. As illustrated in FIG. 4, the flash controller 406 may be configured to process the requests (e.g., 418 and 424) one after the other, where the controller 406 first issues a read request to the L2P flash address, and once the L2P partition is read from the NAND dies 408, obtains the physical flash address for the host data to issue the host data read.

As mentioned above, the back-end portion will not process host reads until the L2P data read from the NVM is available, which may introduce some increase to the read latency. For host writes, however, it is noted the present scheme further affords the ability for back-end to not need to wait for the L2P read completion from the NVM to signal write completion to the host device. In particular, as soon as the front-end portion receives a host write command it initiates the host data transfer and sends an early notification to the FTL to schedule the L2P read to determine the NVM address for the host write. Once the data transfer is completed the front-end queues the host write request to the FTL and sends a completion message to the host device. In this case, the FTL does not have to wait for the L2P read completion and, if the FTL has received has enough data to write, the FTL sends the write request to flash controller to write the host data on the flash or NVM.

Figure 5:
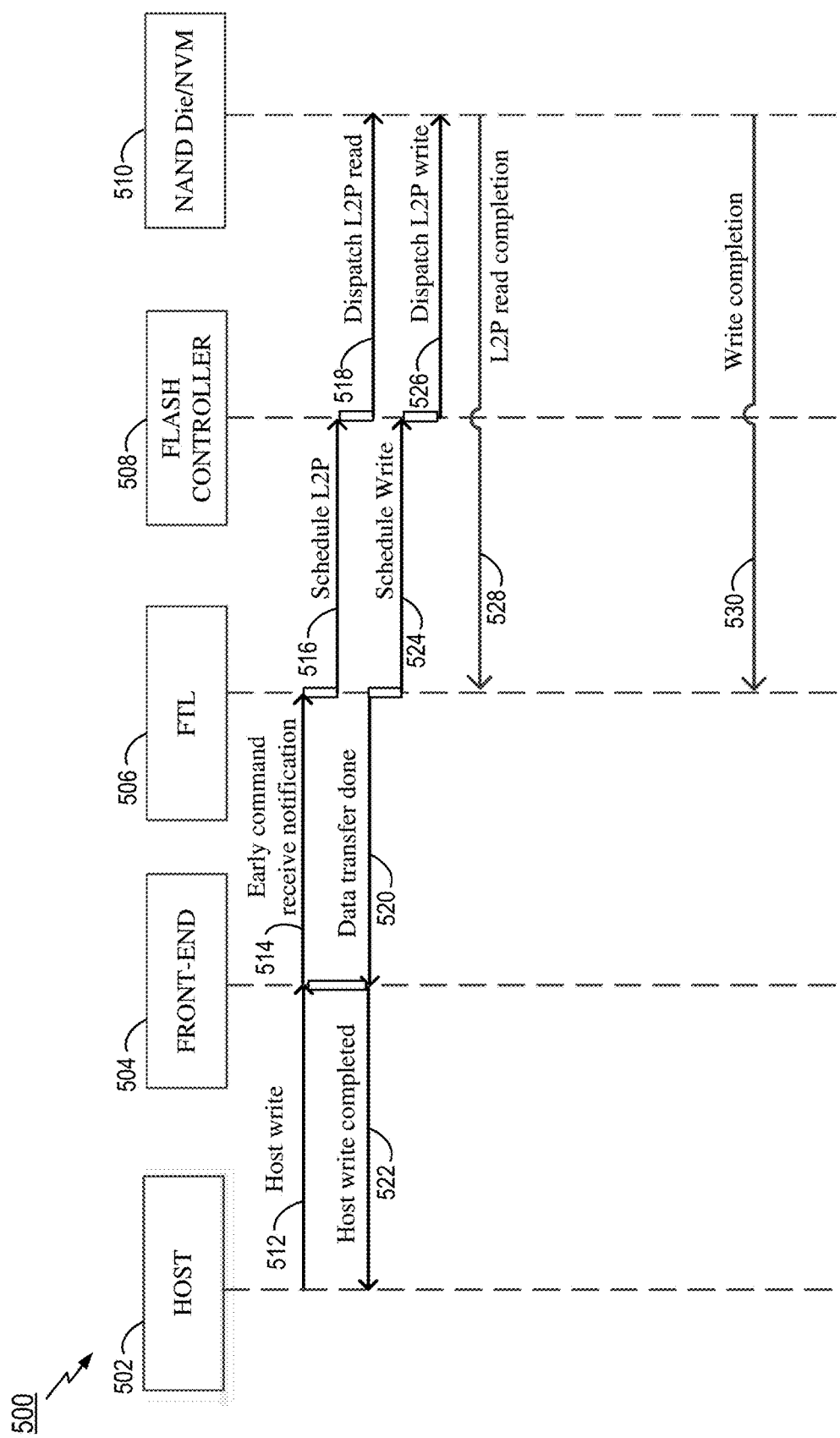
FIG. 5 illustrates an exemplary flow sequence diagram for writes according to aspects of the present disclosure.

FIG. 5 is a flow sequence 500 showing the write processes according to aspects the present disclosure when the host device is writing to the NVM. As illustrated, the sequence 500 shows messaging between a host device 502, a front-end 504, such as the front-end controller 123, the FTL 506, a flash controller 508 (which may be part of back-end control 124 as shown at 126), and the NAND dies 510 (e.g., dies 114). When the host 502 issues a write request 512 to the front-end 504, the front-end, in turn, immediately sends an early command received notification 514 to the FTL 506 to schedule an L2P table read for the host write, as well as starting queueing of data to be written to the NAND dies 510. In response to the command notification 514, the FTL 506 receives, and then issues a schedule L2P read message 516 to the flash controller 508. In turn, the flash controller 508 issues a dispatch L2P read message 518 to the NAND dies 510, which is based on an L2P address obtained from the accessing the partition table 202 stored in RAM memory. The dispatch L2P read 518 initiates access of those particular L2P partitions that may then be read into the RAM in order to ultimately determine the logical to physical mapping for addresses in which to write the data from the host device.

After a time period during which the front-end receives and queues host data to be passed to the FTL 506 for writing of the data, when the data transfer is completed the FTL 506 will send a data transfer done message 520 to the front-end portion 504, which in turn sends the host write completed message 522 to the host 502 even though the L2P read completion has not yet occurred, as well as the write completion of the data in the NAND die 510. This improves latency as the FTL 506 does not need to wait for the L2P read or the write completion before signaling the host that the data transfer is complete (i.e., message 520). Further, after a processing time, the FTL 506 then signals the flash controller 508 to schedule the data write as indicated by message 524. This determination of scheduling the write may be made if there is a predetermined threshold amount data to be written. In response, the flash controller 508 sends a dispatch of the L2P write to the NAND dies 510 as shown by message command 526.

After another time period, FIG. 5 illustrates that the reading of the L2P table is completed with message 528, which is sent directly to the FTL 506. At this point, the FTL 506 will update the L2P table. In an aspect, the logger 128 will log changes to L2P table that results from the L2P write message command 526 and the updated NVM memory location. After the writing of the data in the NAND die 510 is completed, a write completion indication 530 is provided from the NAND die 510 directly to the FTL 506.

As described above, once the data transfer from the host 502 to the front-end portion 504 is completed, the front-end 504 queues the host write request to the FTL 506 and sends the completion message 520 (and 522) to the host device 502. The FTL 506 is configured to not wait for the L2P read completion (e.g., message 528) and, if it has enough data (i.e., the predetermined threshold of data) to write, the FTL 506 sends the write request 524 to the flash controller 508 to write the host data on the flash or NAND dies 510. Furthermore, the FTL 506 queues the new flash address to an address logger (not shown) for updating the L2P table for the written data. In an aspect, whenever an L2P read is completed, the logger will then process the L2P update (e.g., updating the valid page count (VPC) for logging purposes), and write the modified L2P on the flash or NVM at that time. Thus, there is independence between the host writes to the NVM and updates of the L2P table.

Figure 6:
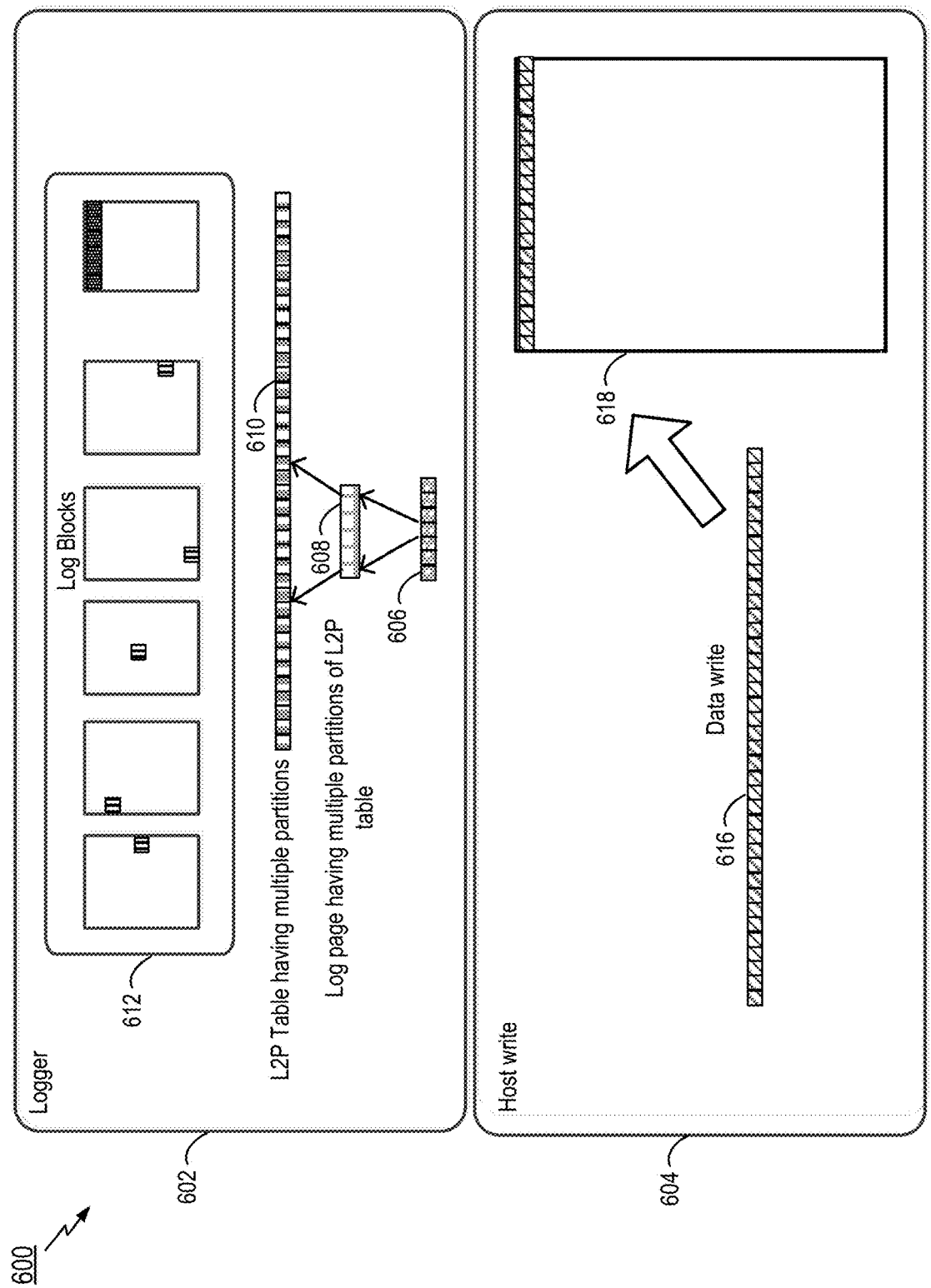
FIG. 6 shows an exemplary block diagram of a logging process and a host write process that, in part, illustrates the independence between the two processes in accordance with aspects of the present disclosure.

FIG. 6 shows an exemplary block diagram 600 of a logger process and a host write process that illustrates the independence between the two processes. As mentioned above, the host write does not depend on the L2P updates. Because of this independence between the two processes, write latency in not impacted and the write performance is improved as well. As shown, a logger or logging process 602, which may be effectuated by logger 128, is shown with host writer or host write process 604, wherein the two processes operate independent of each other. The logging process 602 includes maintaining a log of pages that have been written to during host write processes, as illustrated by 606. A logged page (e.g., 608) may have multiple partitions of the multi-partitioned L2P table (e.g., 610). The logging process 602 ensures that the L2P table is then updated after data writes, where the various updated partitions of the L2P table are located in various log blocks shown within block 612. The host write process 604 operates independent of the logging process wherein host data writes 616 are written to the flash or NVM 114 as shown represented at block 618. It is noted that the logger process 602 may be configured to log or keep track of the L2P updates over a predetermined period and then cause the flash controller (408, 508) to periodically write the logged updates to the NVM 114 in order to update the L2P table.

A challenge presented by the present approach of offering on demand L2P reads is moving valid data from one block (i.e., a source block) to another block (i.e., a destination block) block during garbage collection processes. In this case, the FTL would have to read the L2P table for all the logical pages written in the source block to know if a page is valid or not. Thus, this makes the garbage collection process dependent on L2P reads, as well as making the host write dependent on L2P reads because the host write depends on garbage collection. In order to overcome this challenge, an aspect of the present disclosure provides that the FTL maintains a valid page bitmap for complete physical capacity for inverse look-up to improve the garbage collection and host write performance.

Figure 7:
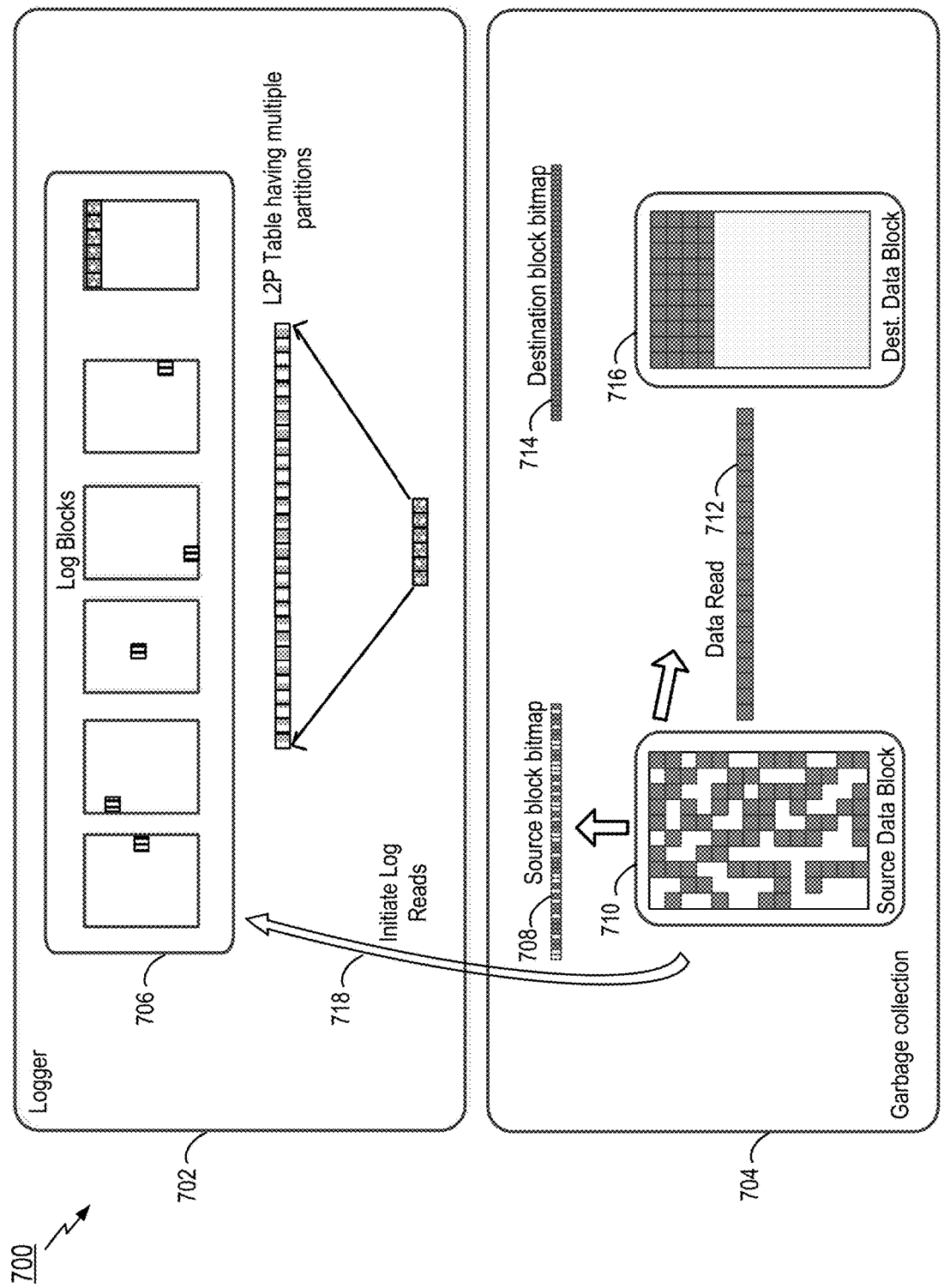
FIG. 7 illustrates an exemplary block diagram of a logging process and a garbage collection process in accordance with aspects of the present disclosure.

FIG. 7 illustrates the processes of logging and garbage collection that is performed in the SSD, including independence between garbage collection and the L2P table. As mentioned above, according to aspects of the present disclosure, the FTL maintains a valid page bitmap for each written logical page in the block. This bitmap may be kept in the RAM memory, but also may be periodically written by the FTL to the NVM to guard against cases of power failure occurring in the RAM memory. During a host write or a garbage collection write, the FTL sets the bit in the bitmap for the written location and clears the bit in the bitmap for the old location. In another aspect, the FTL may be configured to keep a valid page bitmap for complete physical capacity for inverse look-up. During garbage collection, the FTL only reads those pages for which a bit is set in the bitmap. It issues both data and L2P read but garbage collection write does not have to wait for L2P read completion. Therefore garbage collection can work independently.

Turning specifically to the diagram in FIG. 7, this figure illustrates a logger or logging process 702 similar to that shown in process 602 of FIG. 6. In particular, the logging process 702 includes maintaining a log of pages that have been written to during host write processes or during garbage collection as well, as illustrated by garbage collection process 704. The logging process 702 ensures that the L2P table is updated after data writes or garbage collection writes, where the various updated partitions of the L2P table are located in various log blocks shown within block 706. It is noted here that the garbage collection process 704 could be implemented by garbage collector 120 as shown in FIG. 1.

In an aspect, the FTL may be configured to maintain a valid page bitmap for each written logical page in a block, as may be seen through the illustration of source block bitmap 708, wherein bits for valid pages are asserted to indicate a valid page within the source data block 710. As an example, the source block bitmap 708 may be maintained by the FTL and updated during garbage collection process 704 or during a host write. During host write or garbage collection write FTL sets the bit for written location and clears the bit of old location. During garbage collection the FTL may be configured to only read those pages for which a bit is set in the bitmap 708, which indicates valid pages. The FTL issues both a data read of the valid pages (See e.g., data read 712) to be stored in a destination data block 714 (and destination block bitmap 716 for the valid pages written to data block 714) for garbage collection processes and an L2P read for the garbage collection write. It is noted that the FTL does not have to wait for the L2P read completion, however, and thus the garbage collection can work independently. In an aspect, the garbage collector in the FTL may initiate the L2P read as illustrated by arrow 718, but the log write process 702 and the garbage collection process nonetheless work independently. It is also noted that the FTL will update the bitmap for every write that occurs to ensure that each valid data block is maintained by the bitmap.

Figure 8:
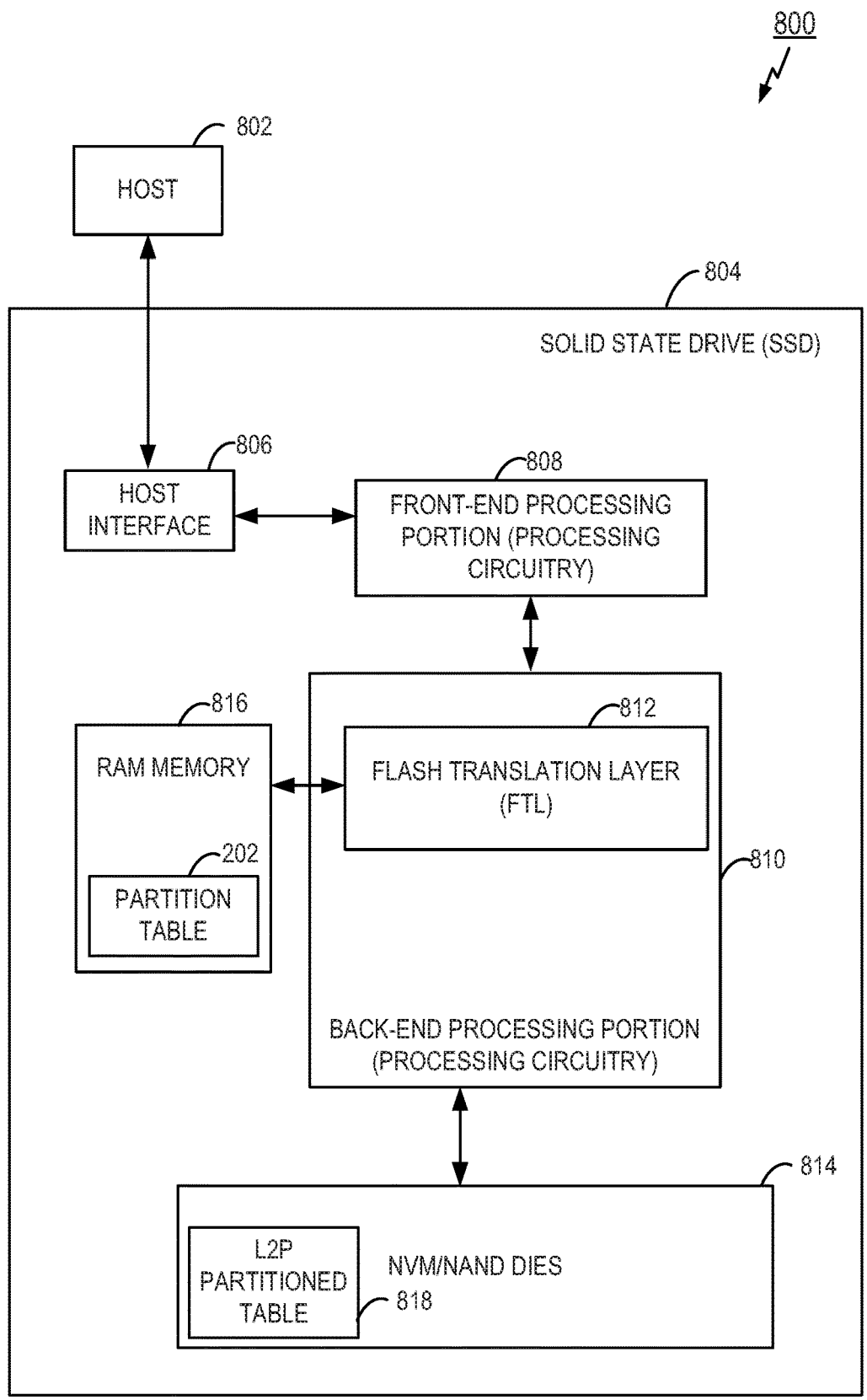
FIG. 8 shows another exemplary schematic block diagram configuration for an SSD device.

FIG. 8 illustrates another exemplary structure of an SSD in accordance with the disclosed scheme herein providing front and back-end portions. A host 802 is communicatively coupled with an SSD 804 via an interface 806. The SSD 804 includes an apparatus for managing the L2P table within the SSD. This apparatus in the SSD includes a front-end processing portion 808, which may include processing circuitry, a CPU, a controller, or any equivalent means for performing interfacing processes, such as those illustrated in FIGS. 4 and 5. The portion 808 is configured to interface with the host device 802 and manage input and output requests from the host device 802, as well as transfer data to or from the host device 802 via interface 806. The front-end processing portion 808 may be configured to queue data received from the host device 802 in certain aspects.

The front-end processing portion 808 is further communicatively coupled with a back-end processing portion 810. The back-end processing portion 810 may include processing circuitry, a CPU, a controller, or any equivalent means for performing NAND write and reads processes and L2P table reads, such was illustrated in sequences of FIGS. 4 and 5. Back-end processing portion 810 may include an FTL 812 that is part of the back-end processing portion 808, as shown, or configured to be separately embodied and/or functioning. The back-end processing portion 810 is also configured to interface with the NVM or NAND dies 814. Additionally the FTL 812 is communicatively coupled with a RAM memory 816. As described before, the NAND dies 814 are configured to store the L2P table in its entirety. The L2P table is configured as illustrated in FIG. 2 with a plurality of partitions (e.g., 206), with each partition containing contiguous flash addresses as part of the logical to physical mapping of the L2P table.

RAM memory 816 includes the partition table 202 that includes one or more addresses of respective partitioned portions of the L2P table stored in the NVM, Flash, or NAND device 814, wherein each partitioned portion 206 includes a predetermined number of contiguous L2P addresses (e.g., 64) that makes up one L2P partition. Flash address of each partition is always loaded in RAM 816 while the actual L2P table is read from the partition table's flash addresses when needed into the RAM 816 for use by the FTL 812.

Figure 9:
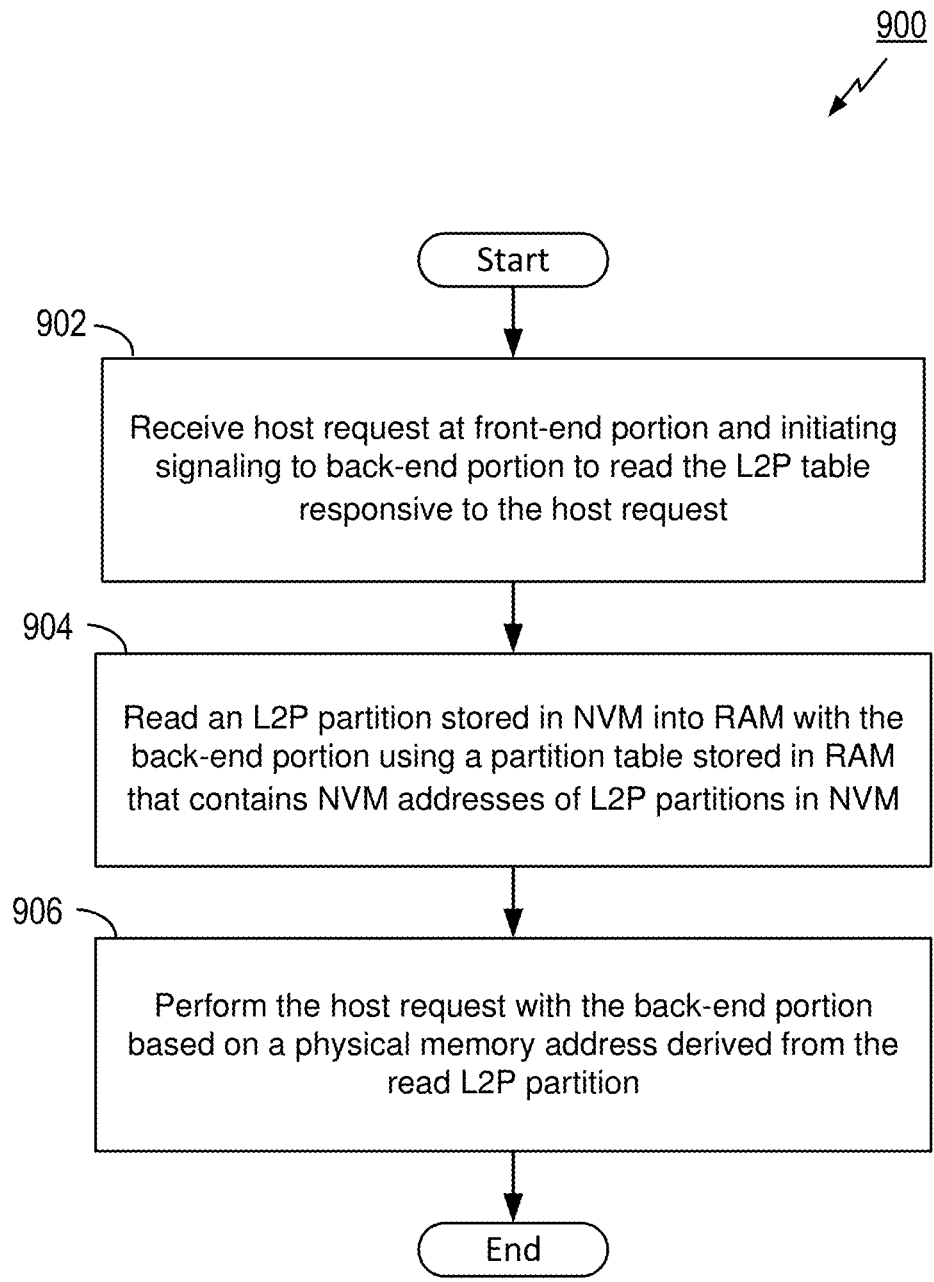
FIG. 9 illustrates an exemplary flowchart according to an aspect of the present methodology for processing host requests using front-end and back-end portions.

FIG. 9 illustrates a flow diagram of an exemplary process 900 for performing requests from a host using the presently disclosed scheme or apparatus, such as those shown in FIGS. 1 and 8. It is noted that method or process 900 may be implemented for either read requests or write requests from a host device. As shown, the process 900 includes receiving a host request at a front-end portion (e.g., front end controller 123 or front-end processing portion 808) and, in turn, initiating signaling to the back-end portion for reading the L2P table. As disclosed above, the back-end portion may include the FTL and/or a back-end control portion (e.g., FTL 116 in back end control portion 124, FTL 406, or portion 810) as shown at block 902. As illustrated in block 904, the back-end portion acting upon the queued read request, then reads the relevant corresponding L2P partition (e.g., 206) stored in the NVM memory into the RAM memory within the NVM controller using the partition table (e.g., 202) containing the L2P partition address and which is already stored in the RAM memory. The back-end portion (or the back-end in conjunction with the front-end) may then perform the host request based on the physical memory address derived from the read L2P partition as illustrated in block 906. While the read and write processes may contain further process, it is nonetheless noted that the process 900 is applicable for both read and write requests from the host device. In particular, the use of front-end and back-end portions in conjunction with an L2P table stored entirely in NVM memory and accessed only when needed is applicable to both read and write operations, such as the sequence illustrated in FIG. 4 for host reads and the sequence illustrated in FIG. 5 for host writes. It is noted that process 906 would be performed prior to reading data in the case of host reads. In the case of host writes, however, the process 906 may involve numerous processes to perform and complete the host write request including the back-end signaling data transfer completion (See signal 520 in FIG. 5), and then subsequent write scheduling and completion (See messages 524, 526, and 530 in FIG. 5), as well as then updating the L2P table based on physical memory address derived from the read L2P partition(s) (See e.g., message 528 in FIG. 5) in order to fully complete the host write request.

According to further aspects, application of the methodology 900 in host read request scenarios may include process 904 including dispatching the L2P read message or instruction to the NVM (See e.g., message 418 in FIG. 4), receiving the L2P data in the back-end portion or controller responsive to the L2P read request (See e.g., message 422 in FIG. 4), processing the L2P data to obtain the physical address for the requested data, dispatching a host read message from the back-end portion or controller to the NVM, and then receiving and sending the read data from the NVM to the front-end without processing delays. In another aspect, the processes of block 904 of reading the L2P address information from the NVM dispatching the host reads to the NVM may be executed in parallel, while the host reads sent to the front end portion are performed in series, as was discussed before. Thus, in certain cases and random reads the processes of blocks 904 and 906 may be repeated numerous times while the front end portion is sending the host data transfers at a slower rate as illustrated further in FIG. 3. Accordingly, the processes of blocks 904 and 906 may be hidden from the host device.

Figure 10:
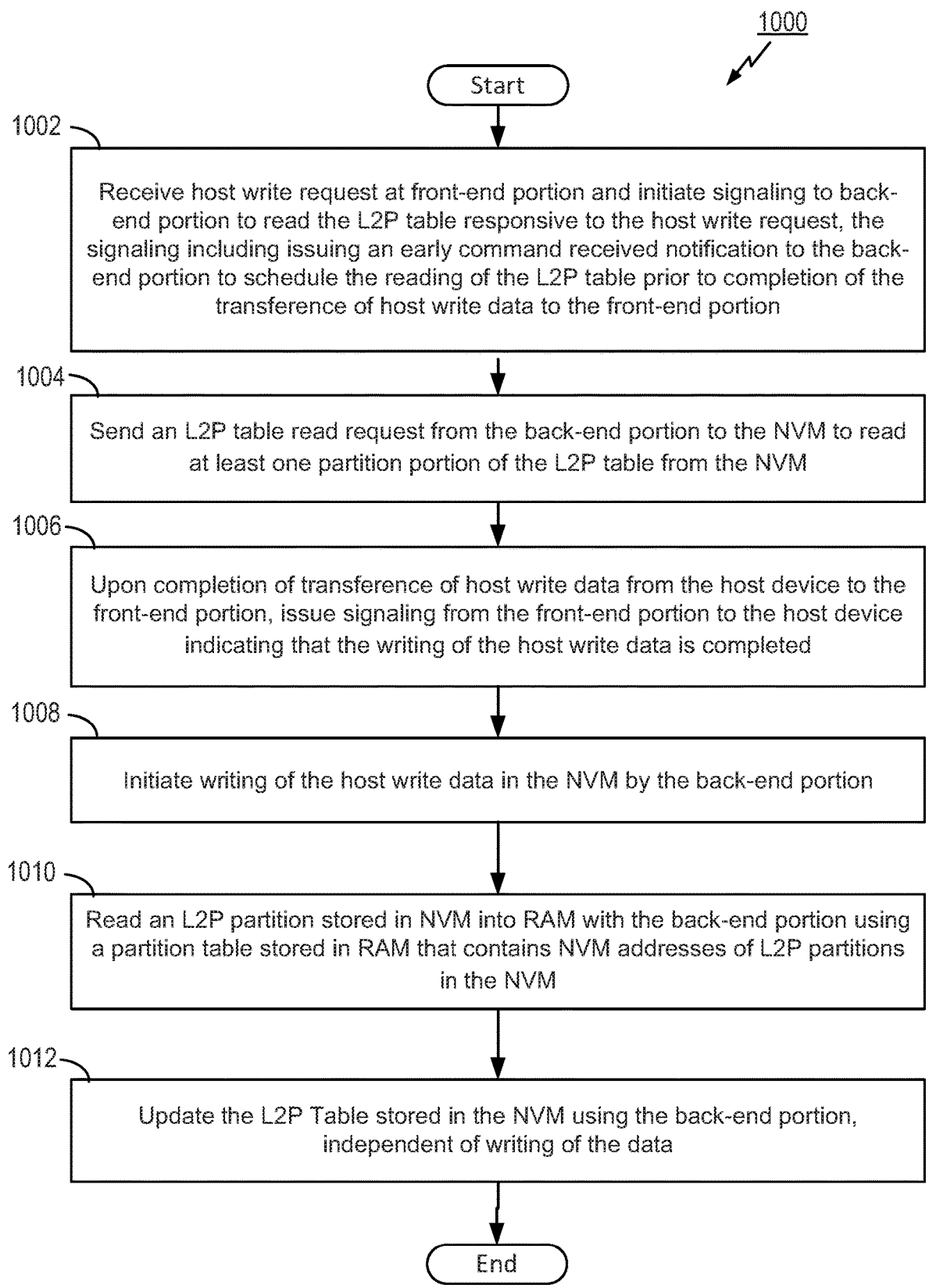
FIG. 10 illustrates an exemplary flowchart according to an aspect of the present methodology for processing host write requests using front-end and back-end portions.

FIG. 10 illustrates a flow diagram 1000 of a specific exemplary method for handling write requests from a host device using the disclosed on demand L2P table scheme. In the case of host writes, method 1000 provides a process 1002 of receiving a host write request at the front-end portion and initiating signaling to the back-end portion to read the L2P table responsive to the host write request where the signaling includes issuing an early command receive notification to the back-end portion to schedule reading of the L2P table prior to completion of transfer of host write data to the front-end portion (See e.g., messages 514 and 516 in FIG. 5).

Furthermore, method 1000 next includes sending an L2P table read request from the back-end portion the NVM to read at least one partition portion of the L2P table from the NVM as shown at block 1004. An example of the processes of block 1004 may be seen in messages 516 and 518 of FIG.

5. The process of block 1004 may also ad performing queuing of host write data to be written in either the front-end portion or the back-end portion while the host write data is being received. Method 1000 further includes issuing signaling from the front-end portion to the host device that writing of host write data associated with the write request is completed upon completion of transfer of the host write data transfer from the host device as shown at block 1006. An example of the process of block 1006 may be seen in FIG. 5 through message 522 in conjunction with message 520 received from the back-end portion and prior to write completion of the write data.

After the host write data transfer is completed from the host device, the back-end portion schedules or initiates writing of the host write data to the NVM as illustrated in block 1008 (See messages 524 and 526 in FIG. 5, as examples of this process). Next, when back-end portion reads at least one L2P partition stored in the NVM in the RAM memory while using the partition table stored in RAM containing NVM addresses of the L2P partitions in the NVM as illustrated in block 1010. It is noted that typically after this process, the actual write of the host write data to the NVM is completed (See e.g., message 530 in FIG. 5). Finally, the L2P table is updated by the back-end portion independent of the actual writing of the data in the NVM as shown at block 1012. In an aspect, the partition table 202 in RAM 110 is updated during the writes to point to the updated locations of the partitions of the L2P (204).

In other aspects, it is further noted that the method shown in FIG. 10 may further include maintaining a bitmap for each written logical page in a block. During a host write or garbage collection the back-end processing portion and FTL, in particular, may maintain the bitmap of valid pages in a block. In an aspect, the bitmap is stored in RAM memory associated with the FTL, but also can be periodically stored in NVM to ensure against data loss in circumstances such as a power loss in the RAM memory. Also in the case of garbage collection, the FTL may be configured to set the bit for a written location in the block and clears the bit for the old location. Moreover during the garbage collection processes, the back-end portion (FTL) may issue both data and L2P read messages but the garbage collection write does not have to wait for the L2P read completion, and thus the garbage collection may operate independent of the L2P read operation.

Figure 11:
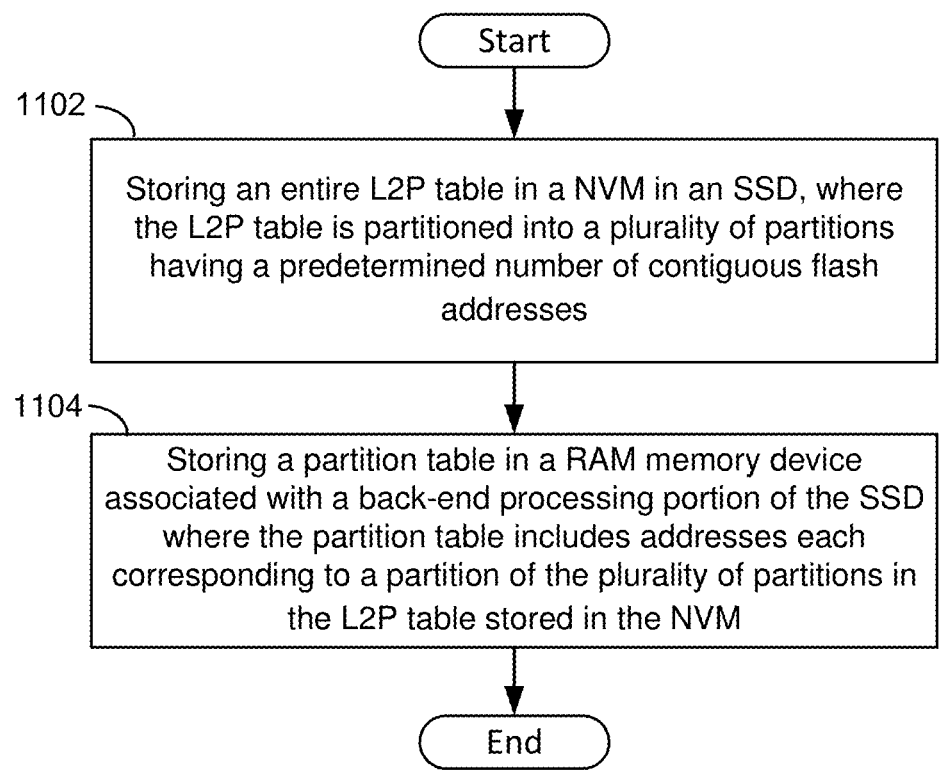
FIG. 11 illustrates a method for configuring an SSD according to aspects of the present disclosure.

FIG. 11 illustrates a method 1100 for configuring an SSD according to aspects of the present disclosure. Method 1100 includes a process or state 1102 of locating, configuring, placing, or storing an entire L2P table in a NVM in an SSD. As discussed above, this location of the L2P table in the NVM avoids having to store the table in RAM memory, which can become prohibitive when the size of the NVM becomes large. Additionally, the L2P table is configured such that it is partitioned into a plurality of partitions (e.g., 206) each having a predetermined number of contiguous flash addresses (e.g., 64 flash addresses). Furthermore, the SSD may be configured such that a back-end portion, such as a processor including the FTL, reads and writes to NVM, as well as reading particular partitions of the L2P table out of the NVM as needed.

Method 1100 further includes a process or state of locating, configuring, placing, or storing a partition table (e.g., table 204) or similarly configured reference table in a RAM memory device associated with a back-end processing portion of the SSD. The partition table is configured to include multiple addresses each corresponding to an address or location of an L2P partition of the plurality of partitions in the L2P table stored in the NVM, enabling the back-end portion to use this table to find locations in the NVM of the partitions of the L2P table stored in the NVM such that the back-end processing portion can find, read, and store the partitions in the RAM memory.

As will be appreciated from the above disclosure, the presently disclosed methods and apparatus serve to reduce the complexity of sequential reads and sequential write workloads since there is only one on demand L2P read for every 256K data, according to the example given earlier. This may enable low cost scalable SSDs to perform better for random write workloads when compared to higher logical page solutions. Additionally, the presently disclosed methods and apparatus avoid excessive RAM costs, improve write amplification and End of life of the SSD, and are scalable.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A storage device comprising:
   a front-end processing portion configured to interface with a host device and manage input and output requests from the host device and transfer data to or from the host device;
   a non-volatile memory (NVM) configured to store a logical to physical (L2P) table in its entirety, where the L2P table is separated into a plurality of partitions;
   a back-end processing portion communicatively coupled with the front-end processing portion and the NVM;
   a random access memory (RAM) communicatively coupled with the back-end processing portion, the RAM including a partition table stored therein, wherein the partition table includes one or more addresses of respective partitioned portions of the plurality of partitions of the L2P table stored in the NVM; and
   wherein the back-end processing portion is configured to receive requests from the host device via the front-end processing portion and to access the partition table to schedule read or write access to the NVM based on the requests by determining one or more addresses of the respective partitioned portions of the plurality of partitions of the L2P table stored in the NVM from the partition table, including issuing an L2P table read that accesses the partition table in the RAM for a host write request, the back-end processing portion including a garbage collection portion configured to recycle blocks in the NVM by performing one or more NVM write operations independent of completion of the L2P table read that accesses the partition table in the RAM for the host write request.

2. The storage device of claim 1, wherein each of the plurality of partitions includes a predetermined number of contiguous logical to physical table addresses.

3. The storage device of claim 1, wherein the front-end processing portion is further configured to queue read requests from the host device and pass the read requests to the back-end processing portion.

4. The storage device of claim 1, wherein the back-end processing portion is further configured to:
 read at least one partition of the L2P table stored in the NVM in response to a host read request by first accessing the partition table stored in the RAM to determine an address of the at least one partition of the L2P table to be read from the NVM;
 determine a physical address of requested data corresponding to the host read request from the at least one partition of the L2P table; and
 read the requested data from the determined physical address in the NVM.

5. The storage device of claim 4, wherein the back-end processing portion is further configured to pass through the requested data read from the NVM to the front-end processing portion based on a determined physical address without further processing by the back-end processing portion.

6. The storage device of claim 1, wherein the back-end processing portion is further configured to process multiple host device requests in parallel.

7. The storage device of claim 6, wherein the front-end processing portion is further configured to perform data transfer between the front-end processing portion and the host device in serial and wherein the back-end processing portion is further configured to achieve a duration for the reading of L2P table portions from the NVM by the back-end processing portion that is less than a duration for a serial data transfer by the front-end processing portion.

8. The storage device of claim 1, wherein the front-end processing portion is further configured to send an early notification message to the back-end processing portion in response to the host write request before completion of a complete transfer of write data from the host device, and
 the back-end processing portion is further configured to initiate reading of at least one partition of the L2P table from the NVM in response to the early notification message.

9. The storage device of claim 8, wherein the front-end processing portion is further configured to queue the host write request and pass the queued host write request to the back-end processing portion.

10. The storage device of claim 8, wherein the front-end processing portion is further configured to send a host write completion message to the host device before the back-end processing portion has completed writing the data associated with the host write request in the NVM.

11. The storage device of claim 8, wherein the back-end processing portion is further configured to write the write data associated with the host write request in the NVM in response to a determination that a predetermined amount of data has been received from the front-end processing portion prior to completion of reading the at least one partition of the L2P table from the NVM in response to the early notification message.

12. The storage device of claim 1,
 wherein the back-end processing portion is further configured to maintain a valid page bitmap in the RAM for each written logical page in a block and set a bit in the bitmap corresponding to a written location in the NVM for write data for a new write address.

13. The storage device of claim 1,
 wherein the back-end processing portion is further configured to maintain a valid page bitmap in the RAM for each written logical page in the block configured to be updated during garbage collection processes, and wherein the back-end processing portion is configured to perform at least one of (a) setting a bit in the bitmap corresponding to a written location in the NVM for the write data for a new write address and (b) clearing a current bit of an old location corresponding to a previous page.

14. The storage device of claim 13,
 wherein the garbage collection portion is further configured to read pages for which a bit is set in the valid page bitmap.

15. An apparatus for operating a storage device the apparatus comprising:
 means for interfacing with a host device and managing input and output requests from the host device and transferring data to or from the host device;
 means for storing a logical to physical address table (L2P table) in its entirety in a non-volatile memory (NVM), where the L2P table includes a plurality of partitions;
 means for accessing memory including accessing a partition table stored in a random access memory (RAM), wherein the partition table includes one or more addresses of respective partitioned portions of the plurality of partitions of the L2P table stored in the NVM;
 means for issuing an L2P table read that accesses the partition table in the RAM for a host write request; and
 means for controlling garbage collection to recycle blocks in the NVM by performing one or more NVM write operations independent of completion of the L2P table read that accesses the partition table in the RAM for the host write request.

16. The apparatus of claim 15, wherein each of the plurality of partitions includes a predetermined number of contiguous logical to physical table addresses.

17. The apparatus of claim 15, wherein the means for interfacing is configured to queue read requests from the host device and pass the read requests to the means for accessing.

18. The apparatus of claim 15, wherein the means for accessing memory comprises:
 means for reading at least one partition of the L2P table stored in the NVM by first accessing the partition table stored in the RAM to determine an address of the at least one partition of the L2P table to be read from the NVM;
 means for determining a physical address of the data corresponding to a host read request from the at least one partition of the L2P table; and
 means for reading requested data from the determined physical address in the NVM.

19. The apparatus of claim 18, wherein the means for accessing memory includes means for passing the requested data to the means for interfacing without intervening processing.

20. The apparatus of claim 15, wherein the means for accessing memory includes means for processing multiple host requests in parallel.

21. A method for operating a storage device, the method comprising:
receiving a host write request at a front-end component of the storage device;
initiating signaling to a back-end component of the storage device for reading a logical to physical address table (L2P table) stored entirely in a non-volatile memory (NVM) communicatively coupled to the back-end component, wherein the L2P table includes a plurality of L2P table partitions;
determining an L2P table partition to be read from the NVM based on reading a partition table stored in a random access memory (RAM) coupled to the back-end component, the partition table including a plurality of partition addresses corresponding to the plurality of L2P table partitions stored in the NVM to determine a partition address of a particular L2P table partition;
transferring the particular L2P table partition from the NVM into the RAM based on the partition address of the particular L2P table partition;
performing the host write request using at least the back-end component based on a physical NVM address determined from the particular L2P table partition, including issuing an L2P table read that accesses the partition table in the RAM for the host write request; and
performing garbage collection to recycle blocks in the NVM by executing one or more NVM write operations independent of completion of the L2P table read that accesses the partition table in the RAM for the host write request.

22. The storage device of claim 1, further comprising a memory component configured to store a valid page bitmap for inverse look-up for use by the garbage collection portion.

23. The storage device of claim 22, wherein the memory component is configured to store the valid page bitmap for a complete physical capacity of the NVM.

24. The storage device of claim 1, wherein the back-end processing portion is further configured to issue both a data read of a valid page to be stored in a destination data block of the NVM for a garbage collection read and an L2P read for a garbage collection write.

25. The apparatus of claim 15, further comprising means for storing a valid page bitmap for inverse look-up for use by the means for controlling garbage collection.

26. The apparatus of claim 25, wherein the means for storing a valid page bitmap is configured to store the valid page bitmap for a complete physical capacity of the NVM.

27. The apparatus of claim 15, wherein the means for accessing memory includes means for issuing both a data read of a valid page to be stored in a destination data block of the NVM for a garbage collection read and an L2P read for a garbage collection write.

28. The method of claim 21, further comprising storing a valid page bitmap for inverse look-up for use by the means for controlling garbage collection.

29. The method of claim 28, wherein storing a valid page bitmap includes storing the valid page bitmap for a complete physical capacity of the NVM.

30. The method of claim 21, further comprising issuing both a data read of a valid page to be stored in a destination data block of the NVM for a garbage collection read and an L2P read for a garbage collection write.

31. The method of claim 21, further comprising:
reading at least one partition of the L2P table stored in the NVM in response to a host read request by first accessing the partition table stored in the RAM to determine an address of the at least one partition of the L2P table to be read from the NVM;
determining a physical address of data corresponding to the host read request from the at least one partition of the L2P table; and
reading requested data from the determined physical address in the NVM.

32. The method of claim 21, further comprising queueing read requests from a host device in the front-end component and then passing the read requests from the front-end component to the back-end component.

* * * * *